US012047160B2

(12) United States Patent
Faulkner et al.

(10) Patent No.: US 12,047,160 B2
(45) Date of Patent: Jul. 23, 2024

(54) CORRECTING FREQUENCY AND/OR PHASE IN A COMMUNICATION LINK

(71) Applicant: Stratospheric Platforms Ltd, Douglas (IM)

(72) Inventors: Andrew Faulkner, Douglas (IM); Fraser Edwards, Cambridge (GB)

(73) Assignee: Stratospheric Platforms Ltd, Douglas (IM)

( * ) Notice: Subject to any disclaimer, the term of this patent is extended or adjusted under 35 U.S.C. 154(b) by 158 days.

(21) Appl. No.: 17/593,961

(22) PCT Filed: Mar. 20, 2020

(86) PCT No.: PCT/GB2020/050749
§ 371 (c)(1),
(2) Date: Sep. 29, 2021

(87) PCT Pub. No.: WO2020/201708
PCT Pub. Date: Oct. 18, 2020

(65) Prior Publication Data
US 2022/0182135 A1    Jun. 9, 2022

(30) Foreign Application Priority Data
Mar. 29, 2019    (GB) .................................... 1904437

(51) Int. Cl.
*H04B 7/204*    (2006.01)
*H04B 7/185*    (2006.01)
*H04L 27/26*    (2006.01)

(52) U.S. Cl.
CPC ....... *H04B 7/2041* (2013.01); *H04B 7/18504* (2013.01); *H04B 7/18508* (2013.01);
(Continued)

(58) Field of Classification Search
CPC .............. H04B 7/2041; H04B 7/18504; H04B 7/18508; H04B 7/18515; H04B 7/18517;
(Continued)

(56) References Cited

U.S. PATENT DOCUMENTS 5,455,964 A * 10/1995 Roos ......................... H03J 7/02
                                                        455/67.14
6,675,013 B1 * 1/2004 Gross .................. H04B 7/18504
                                                        455/12.1
(Continued)

FOREIGN PATENT DOCUMENTS

| CN | 105375957 A | 3/2016 |
|---|---|---|
| EP | 2273693 A2 | 1/2011 |

(Continued)

OTHER PUBLICATIONS

"International Application No. PCT/GB2020/050749, International Search Report and Written Opinion mailed Jun. 26, 2020", (Jun. 26, 2020), 11 pgs.

(Continued)

*Primary Examiner* — Lana N Le
(74) *Attorney, Agent, or Firm* — Schwegman Lundberg & Woessner, P.A.

(57) ABSTRACT

A method for correcting frequency and/or phase in a communication link; a communication network; and a multiplexing and phase compensation unit are disclosed. The method for correcting frequency and/or phase in a communication link comprises receiving at least one reference transmission communicated via a wireless communication link; providing at least one identified characteristic by identifying at least one characteristic of the reference transmission; comparing said identified characteristic with at least one expected characteristic; and correcting a shift in frequency and/or phase of at least one communication signal communicated via the communication link based on a (Continued)

difference between the identified characteristic and the expected characteristic.

7 Claims, 5 Drawing Sheets

(52) U.S. Cl.
CPC ..... *H04B 7/18515* (2013.01); *H04B 7/18517* (2013.01); *H04L 27/2655* (2013.01)

(58) Field of Classification Search
CPC ........ H04B 1/7075; H04B 7/01; H04B 7/084; H04B 1/713; H04B 2201/70701; H04B 7/185; H04B 7/18513; H04L 27/2655; H04L 27/2675; H04L 27/3836; H04L 2027/0026; H04L 2027/0089; H04L 27/361; H04L 5/0048; H04L 5/005; H04L 7/033; H04L 2027/0065; H04L 27/2276; H04L 1/0003; H04L 1/0001; H04L 2027/0067; H04L 27/2003; H04L 27/262; H04L 25/03159; H04L 27/2647
See application file for complete search history.

(56) References Cited

U.S. PATENT DOCUMENTS

| | | | |
|---|---|---|---|
| 9,992,011 B1* | 6/2018 | Dyson | H04L 7/048 |
| 11,888,671 B2* | 1/2024 | Hasegawa | H04L 27/2647 |
| 11,924,011 B2* | 3/2024 | Sarajlic | H04L 1/0003 |
| 2003/0063700 A1* | 4/2003 | Tzou | H04L 27/3827 375/376 |
| 2010/0164782 A1 | 7/2010 | Saha et al. | |
| 2011/0122846 A1* | 5/2011 | Yu | H04J 13/16 370/335 |
| 2011/0249778 A1* | 10/2011 | Azenkot | H04L 27/0014 375/343 |
| 2013/0070677 A1* | 3/2013 | Chang | H04B 7/2041 370/328 |
| 2018/0278456 A1* | 9/2018 | Sternklar | H04L 27/361 |
| 2019/0363784 A1* | 11/2019 | Chang | H04B 7/208 |
| 2019/0364579 A1* | 11/2019 | Zhang | H04B 7/2655 |
| 2020/0120458 A1* | 4/2020 | Aldana | H04W 72/23 |
| 2020/0137779 A1* | 4/2020 | Sun | H04L 27/0026 |
| 2021/0399790 A1* | 12/2021 | Morozs | H04B 7/024 |
| 2022/0104223 A1* | 3/2022 | Wang | H04L 27/0014 |

FOREIGN PATENT DOCUMENTS

| | | |
|---|---|---|
| EP | 3279694 A1 | 2/2018 |
| WO | WO-0201750 A2 | 1/2002 |
| WO | WO-2020201708 A1 | 10/2020 |

OTHER PUBLICATIONS

"United Kingdom Application GB1904437.9, Search Report dated May 12, 2020", (May 12, 2020), 1 pg.
"International Application No. PCT/GB2020/050749, International Preliminary Report on Patentability mailed Oct. 14, 2021", 9 pgs.
"Chinese Application 202080026438.0, First Office Action dated Dec. 27, 2023", (Dec. 27, 2023), 16 pgs.
"European Application 20714674.7, Communication pursuant to Article 94(3) EPC", (Jan. 17, 2024), 8 pgs.

* cited by examiner

CORRECTING FREQUENCY AND/OR PHASE IN A COMMUNICATION LINK

PRIORITY CLAIM TO RELATED APPLICATIONS

This application is a U.S. national stage filing under 35 U.S.C. § 371 from International Application No. PCT/GB2020/050749, filed on 20 Mar. 2020, and published as WO2020/201708 on 8 Oct. 2020, which claims the benefit under 35 U.S.C. 119 to United Kingdom Application No. GB 1904437.9, filed on 29 Mar. 2019, the benefit of priority of each of which is claimed herein, and which applications and publication are hereby incorporated herein by reference in their entirety.

The present invention relates to a method and apparatus for correcting for phase shift in a communication link. In particular, but not exclusively, the present invention relates to a method for correcting frequency and/or phase in a communication link between a ground-based station and an aerial vehicle such as a High Altitude Platform (HAP).

The provision of high bandwidth wireless communications using aerial vehicles has been suggested for many years. An example of an aerial vehicle is a HAP. There are various types of HAP, such as tethered balloons or manned aircraft or unmanned aircraft. HAPs may be deployed in the stratosphere, at an altitude range of 15-22 km. Communication links between User Equipment (UE) and a cellular network infrastructure (Core Network) via HAPs cover significantly wider areas line-of-sight (LoS) than terrestrial communication links while avoiding capacity and propagation delay limitations experienced by satellite communication links. For example, geostationary satellites are located approximately 1800×further from the earth's surface than HAPs.

Communication links between HAPs and UE, hereafter referred to as fronthaul (FH) communication links, are associated with coverage cells that define an area supporting UE-HAP communications over an allocated frequency band. UE within a cell may be assigned frequencies to transmit communications at within the allocated band. Cells are supported by beams from directional antenna elements mounted to HAPs. The directional antenna elements may optionally be provided by a phased antenna array. An example of a phased antenna array is a low frequency array, which may operate at frequencies of ~2 GHz, optionally with allocated bandwidth of ~100 MHz per cell.

Supporting high capacity FH communication links requires increasing frequency bandwidth as public demand for connectivity grows. Consequently, in order to provide FH communication links with sufficient bandwidth, backhaul (BH) communication links with sufficient bandwidth are required to support the FH communication links. BH communication links describe a portion of the network between the HAPs and ground-based stations; located on the ground and in connection with a core network. Supporting multiple cells from HAPs would require a ground-based station for each FH communication link if BH communication links were provided on a similar frequency band as that used by the FH communication links. To install and run the number of ground-based stations required to support the FH communication links would be costly under such conditions. Therefore, higher frequency transmissions are used for BH communication links to provide greater bandwidth, thus reducing the number of ground-based stations required to provide sufficient bandwidth to the FH communication links. As an example, 48 GHz bands may be assigned to BH communication links.

Using higher frequency transmissions for BH communication links to distribute the increased bandwidth for low frequency FH communication links requires a frequency conversion. Such a process should minimise any loss in coherence of transmitted beams.

A HAP has a limited payload restricting the mass and thus effective weight of communications equipment that can be supported in the air. An approach to minimise the equipment on the HAP is to use a "bent pipe" method to transform high frequency BH communication signals into low frequency FH communication signals. The bent pipe method is a process of transferring an RF waveform on an incoming frequency band onto an outgoing frequency band. The result of this method is that each HAP behaves somewhat like a mirror, reflecting signals between ground-based stations and UE. A benefit of using such a method is that the amount of communications equipment required to be installed on a HAP can be minimised. This makes the communications equipment on the HAP protocol independent.

Data communication systems typically operate by encoding symbols onto an RF signal. Each symbol encodes a number of bits of data by using a combination of phase and amplitude to use as much of the Shannon limit as practical for any given RF link quality and bandwidth. For example, LTE communications use a maximum of 256-QAM (quadrature amplitude modulation), or 8-bits per symbol, requiring very precise phase stability over a coherence time of 1 ms. Such precision is difficult to achieve at high frequencies of e.g. 48 GHz. For efficient bandwidth usage at mm-Wave frequencies there is no change in signal format when translated to this band.

Controlling stability of a communication channel is particularly challenging when translating from a BH communication link to a FH communication link, such as when sending information from a core network to UE via HAPs. In such an example of communicating from ground-based stations to UE via HAPs, effects of unknown phase changes on signals of the high frequency BH link are transferred onto signals of the lower frequency FH link. In an example, a phase change in a signal of ~6 mm wavelength at low frequency translates to an equivalent phase change in a wavelength of ~15 cm. This represents an increase of about a factor of 24× in the signal travel time or distance precision required to maintain correct phase in the case of 48 GHz compared to 2 GHz.

Motion of HAPs can result in loss of phase synchronisation in the signals received from the ground. Constant motion may result in a predictable phase difference that may easily be accounted for, such as doppler shift, however correcting for phase shift due to acceleration, changes in direction, intrinsic vibration and atmospheric buffeting of HAPs is more difficult.

In order for a desired signal to be preserved through a bent pipe system, described above, corrections to all of the aforementioned effects need to be performed in real time, with minimal delay along a transmission path. It is very difficult to use an external position measurement, communicate the position and then correct the signal in real time quickly enough to correct signal integrity.

It is an aim of the present invention to at least partly overcome one or more of the aforementioned problems.

It is an aim of certain embodiments of the present invention to provide a telecommunications network.

It is an aim of certain embodiments of the present invention to provide a method of correcting frequency and/or phase in high frequency communication links using in-band pilot signals.

It is an aim of certain embodiments of the present invention to provide at least one multiplexing and phase correction (MPC) unit for correcting phase of high frequency communication links using, for example, pilot signals.

It is an aim of certain embodiments of the present invention to provide a BH communication link with sufficient bandwidth to support a plurality of FH communication links.

According to a first aspect of the present invention there is provided a method for correcting frequency and/or phase in a communication link, comprising: receiving at least one reference transmission communicated via a wireless communication link; providing at least one identified characteristic by identifying at least one characteristic of the reference transmission; comparing said identified characteristic with at least one expected characteristic; and correcting a shift in frequency and/or phase of at least one communication signal communicated via the communication link based on a difference between the identified characteristic and the expected characteristic.

Aptly the reference transmission has a frequency range within a high frequency bandwidth up to 10 MHz.

Aptly the reference transmission comprises one or a combination of; at least one pilot symbol, at least one pilot tone and/or a pilot complex waveform.

Aptly the at least one characteristic comprises one or a combination of; frequency, time, phase, symbol, waveform, and/or modulation.

Aptly the at least one expected characteristic comprises one or a combination of; frequency, time, phase, symbol, waveform, and/or modulation.

Aptly the communication link comprises at least one wide bandwidth communication link.

Aptly the communication signal is of mm-Wave frequency.

According to a second aspect of the present invention there is provided a communication network, comprising; a core network in connection with at least one ground-based station; at least one first communication link between the ground-based station and at least one aerial vehicle; and at least one radio frequency communication link between the aerial vehicle and the user equipment, wherein the at least one first communication link communicates a communication signal and a reference transmission.

Aptly the at least one first communication link comprises at least one wide bandwidth communication link.

Aptly the at least one first communication link comprises at least one mm-Wave communication link.

Aptly the communication network further comprises at least one at least one phase compensation element.

Aptly the communication network further comprises at least one multiplexing element.

Aptly the communication network further comprises at least one demultiplexing element.

Aptly the communication network further comprises a clock.

Aptly the communication network further comprises at least one reference transmission generator.

Aptly the communication network further comprises a mixer.

Aptly the at least one ground-based station comprises at least one multiplexing and phase compensation unit.

Aptly the at least one aerial vehicle comprises at least one multiplexing and phase compensation unit.

Aptly the at least one aerial vehicle comprises at least one directional antenna.

According to a third aspect of the present invention there is provided a multiplexing and phase compensation unit, comprising: at least one multiplexing element; at least one demultiplexing element; at least one phase compensation element; a clock; and at least one reference transmission generator.

Aptly the at least one reference transmission generator is for providing signals to the at least one multiplexing element.

Aptly the clock is for providing at least one expected characteristic of a reference transmission to the at least one phase compensation element.

Aptly the multiplexing and phase compensation unit further comprises at least one or a combination of; a transmitter element, a receiver element and a transceiver element.

Aptly the multiplexing and phase compensation unit further comprises a mixer.

Aptly the multiplexing and phase compensation unit further comprises; at least one Analogue-to-Digital converter; and at least one Digital-to-Analogue converter.

According to a fourth aspect of the present invention there is provided a method for correcting at least one parameter associated with a communication link, comprising: receiving at least one reference transmission communicated via a wireless communication link; providing at least one identified characteristic by identifying at least one characteristic of the reference transmission; comparing said identified characteristic with at least one expected characteristic; and correcting a shift in at least one parameter associated with at least one communication signal communicated via the communication link based on a difference between the identified characteristic and the expected characteristic.

Aptly the at least one parameter comprises frequency and/or phase.

According to a further aspect of the present invention there is provided a computer program product stored on a non-transitory computer readable storage medium comprising computer instructions that, when executed on at least one processor-based device, cause the at least one processor-based device to correct phase in a communication link. Aptly the processor-based device is caused to: receive at least one reference transmission communicated via a wireless communication link, provide at least one identified characteristic by identifying at least one characteristic of the reference transmission, compare the identified characteristic with at least one expected characteristic and correct a shift in frequency and/or phase of at least one communication signal communicated via the communication link based on a difference between the identified characteristic and the expected characteristic.

Aptly the shift in phase is caused by undesired or uncontrolled effects associated with the communication channel associated with the wireless communication link and these shifts can be corrected for.

According to certain aspects of the present invention pilot signals generated in an MPC may comprise time information from a clock. The pilot signals generated may be fed into the transmit path of an MPC.

Aptly the pilot signals may be fed into a multiplexing element on the transmit path of the MPC.

Alternatively there could be one channel for which multiplexing and demultiplexing may not be required.

Aptly when receiving a pilot signal on the receiving path of an MPC, time information from the clock of the receiving MPC may be used as a reference against the time information in a pilot signal received.

Aptly frequency and phase information from the clock of the receiving MPC may be used as a reference against frequency and phase information in a received pilot signal. Aptly an MPC unit may further comprise one or more mixers for converting from base-band frequency signals to higher or lower frequency signals.

According to certain embodiments of the present invention there is provided a telecommunications network comprising; a core network in connection with at least one terrestrial ground-based station; at least one BH communication link between the at least one ground-based station and at least one HAP; and at least one FH communication link between at least one HAP and at least one UE, wherein the at least one BH communication link provides sufficient bandwidth to support the at least one FH communication link.

Aptly the at least one ground-based station comprises an MPC unit that is capable of multiplexing and/or demultiplexing communication signals and/or pilot signals transceived between the at least one ground-based station and at least one HAP.

Aptly the at least one ground-based station may optionally comprise an MPC unit without multiplexing and/or demultiplexing capabilities.

Aptly the at least one HAP comprises an MPC unit that is capable of multiplexing and/or demultiplexing both communication signals and/or reference transmissions such as pilot signals or pilot symbols transceived between the at least one ground-based station and at least one HAP, and communication signals transceived between the at least one HAP and at least one UE.

Aptly a BH communication link provides sufficient bandwidth to support a plurality of FH communication links by operating with a wider bandwidth and optionally at a frequency higher than that of the FH communication link.

Aptly the at least one BH communication link operates over mm-Wave frequency bands.

According to certain embodiments of the present invention a reference transmission such as a pilot signal may be a signal of known frequency and form. For example the frequency and phase of the signal are known at each end of the link. Examples of pilot signals that may be used comprise pilot tones or pilot symbols spread through the frequency spectrum used for the communication link. Transmitting tones at different frequencies spread through a designated bandwidth helps to account for frequency dependent distortions. Some examples of pilot symbols that may be utilised in embodiments of the present invention may comprise waveform, time and/or modulation. Reference transmissions may occur periodically and/or continuously and/or repeatedly and/or at predetermined times or pseudo random times.

An MPC unit according to certain embodiments of the present invention may comprise at least one multiplexing element or at least one demultiplexing element or a combination of multiplexing elements and demultiplexing elements. An MPC unit may further comprise a transmit path and a receiving path. Optionally, an MPC unit may comprise at least one system for bypassing the at least one multiplexing element and/or the at least one demultiplexing element on the transmit path and/or receiving path respectively, in the event that a single channel is communicated. An MPC unit may further comprise at least one or a combination of transmitters, receivers or transceivers. An MPC unit of the present invention may further comprise a clock. In certain embodiments of the present invention, pilot signals may be generated within an MPC. According to certain embodiments of the present invention, the at least one or combination of transmitters, receivers and/or transceivers is separate to or integrated with the MPC unit.

According to certain embodiments of the present invention a method for adjusting phase associated with a wireless communication link is provided. The method includes, receiving at a computing-based device, at least one pilot signal and identifying at least one characteristic associated with the pilot signal. The identified characteristic can be compared with at least one predetermined or expected characteristic of the received pilot signal. A shift in phase of a wireless communication signal, which optionally can be a high frequency communication signal, is corrected for based on a difference between the identified characteristic and the at least one expected or predetermined characteristic.

Certain embodiments of the present invention will now be described hereinafter, by way of example only, with reference to the accompanying drawings in which.

In the drawings like reference numerals refer to like parts.

Figure 1:
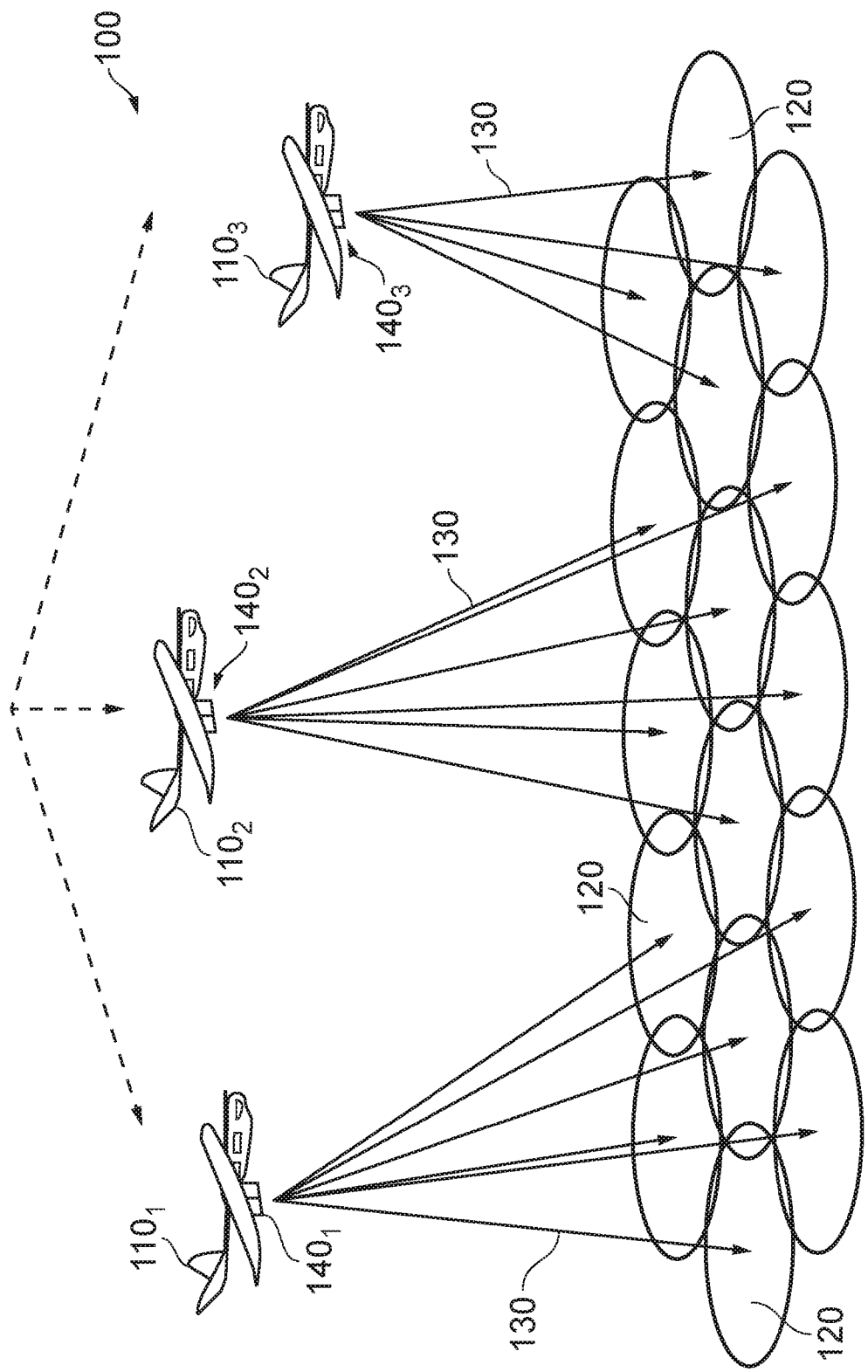
FIG. 1 illustrates multiple HAPs providing cells on the ground from the projection of respective beams from the HAPs.

Certain embodiments of the present invention provide a method and system for connecting User Equipment (UE) to ground-based stations via High Altitude Platforms (HAPs). The UE can be mobile phones, laptops, PDAs or the like. UE communications are supported by cells provided by HAP beams. FIG. 1 illustrates parts of a telecommunications network 100 which includes one or more (three shown) aerial vehicles. The aerial vehicles shown are HAPs $110_{1-3}$. The HAPs $110_{1-3}$ support coverage cells 120 with respective beams 130 of a predetermined frequency, for example ~2 GHz. The beams are shown schematically in FIG. 1 and are illustrated via respective arrows. This arrangement outlines examples of fronthaul communication links. Each beam is generated via a directional antenna $140_{1-3}$. Horn antennas or a multi-element phased antenna array or the like may be used.

Figure 2:
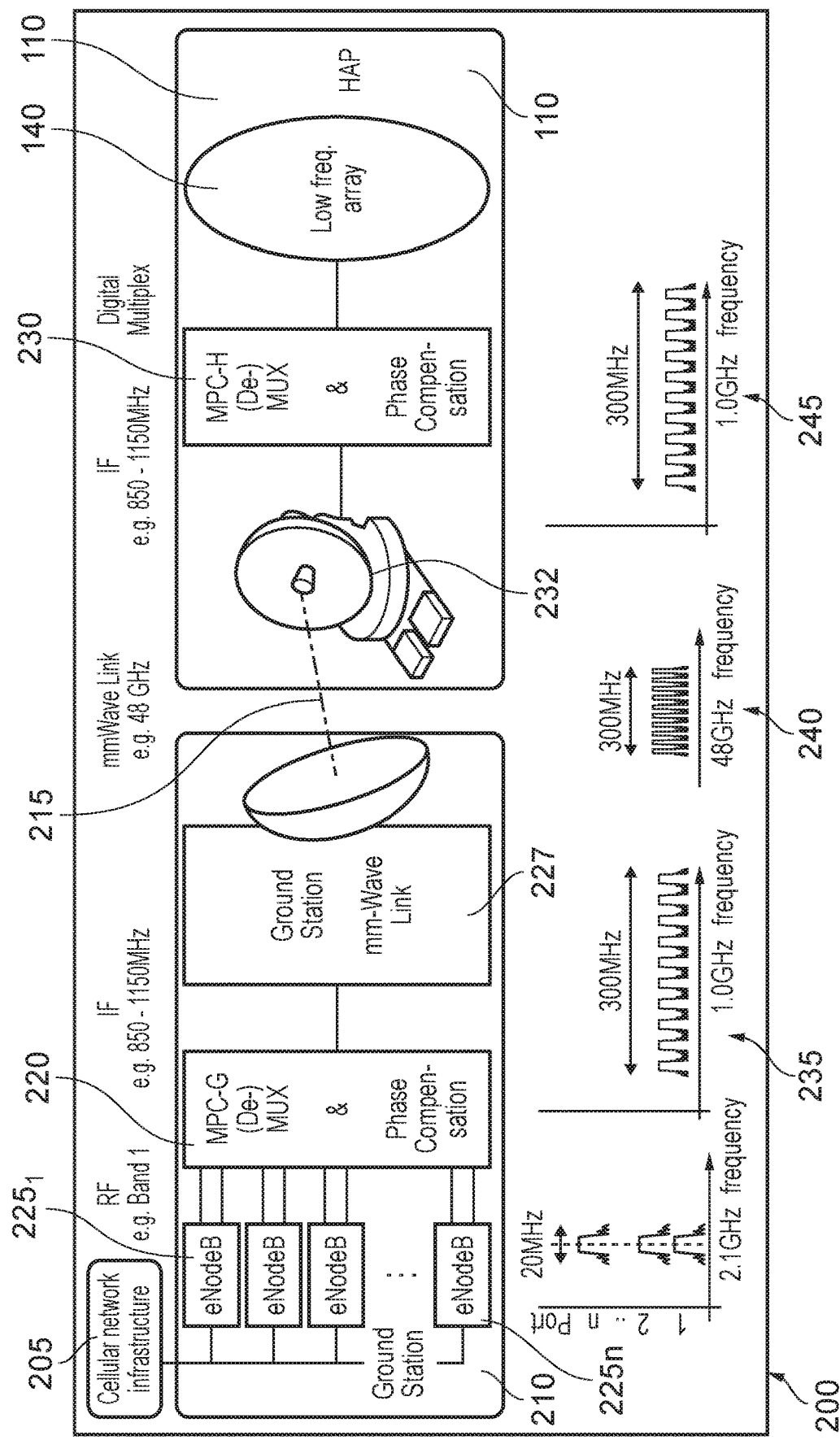
FIG. 2 illustrates parts of an example system configuration for establishing a high frequency communication link between a ground-based station and a HAP supporting a low frequency antenna array to support communications between UE and a core network.

FIG. 2 illustrates apparatus utilised to establish a backhaul communication link (not shown in FIG. 1). A system 200 may comprise a core network 205 connected to at least one network service provider and/or the internet. A ground-based base station 210 is in connection with the core network. A wireless communication link 215 is provided for the backhaul communication link between the ground-based station 210 and a HAP 110 or other such aerial vehicle. Optionally, the wireless communication link 215 may operate on mm-Wave frequencies to provide a wide bandwidth communication link. Optionally, the wireless communication link 215 may be a first communication link.

Aptly, the ground-based station is a backhaul ground station (BGS) 210. The BGS is a ground-based station for connecting at least one HAP using at least one backhaul link via a MPC to at least one eNodeB. The BGS provides transmitter, receiver and/or processing elements required to convert and/or generate waveforms for the backhaul link. Said waveforms may be transmitted and received in the mm-Wave band. For downlink, signals from a HAP to a BGS, a received waveform is processed by the BGS and fed to the MPC for demultiplexing and phase correction before being received at the at least one eNodeB.

The ground-based station 210 may comprise a multiplexing and phase correcting unit 220 (MPC-G) and, in this example, eNodeB interfaces $225_{1 \ldots n}$ that each support a respective beam corresponding to a cell on the ground for FH communication links to UE. The ground-station 210 may further comprise a mixer (not shown) to convert transmissions from base-band frequency to high frequency and vice versa. The ground-based station 210 further comprises transceiver apparatus 227 for transmitting and/or receiving multiplexed signals, for example over a backhaul communication link, such as the at least one wireless communication link 215, to and/or from at least one High Altitude Platform (HAP) 110. Optionally, alternative wavelength communication links may be utilised.

Signals received over the wireless communication link 215 at a HAP 110 may be processed by at least one multiplexing and phase correcting unit MPC-H 230, wherein the received signals may be phase corrected and demultiplexed in order to transmit demultiplexed signals from a low frequency antenna array 140 mounted on the HAP 110. The MPC-H 230 may include transceiver apparatus 232 for transmitting and/or receiving multiplexed signals, for example, over a mm-Wave communication link 215. Optionally, wherein a single channel signal is received, the received signal may not be demultiplexed on the receiving path of the MPC-H 230.

An example channel width of 300 MHz centered at 1 GHz in this embodiment is illustrated via a graphic 235, while the same channel width at higher frequency is illustrated via the central lower graphic 240 of FIG. 2, demonstrating that the same channel width at higher frequency consumes less of the total bandwidth available. The lower right hand side graphic 245 illustrates a waveform converted back to a bandwidth of 300 MHz centered again at 1 GHz and presented to the MPC-G for correction and demultiplexing, ready for transmission via the directional antenna 140 over FH communication links.

Figure 3:
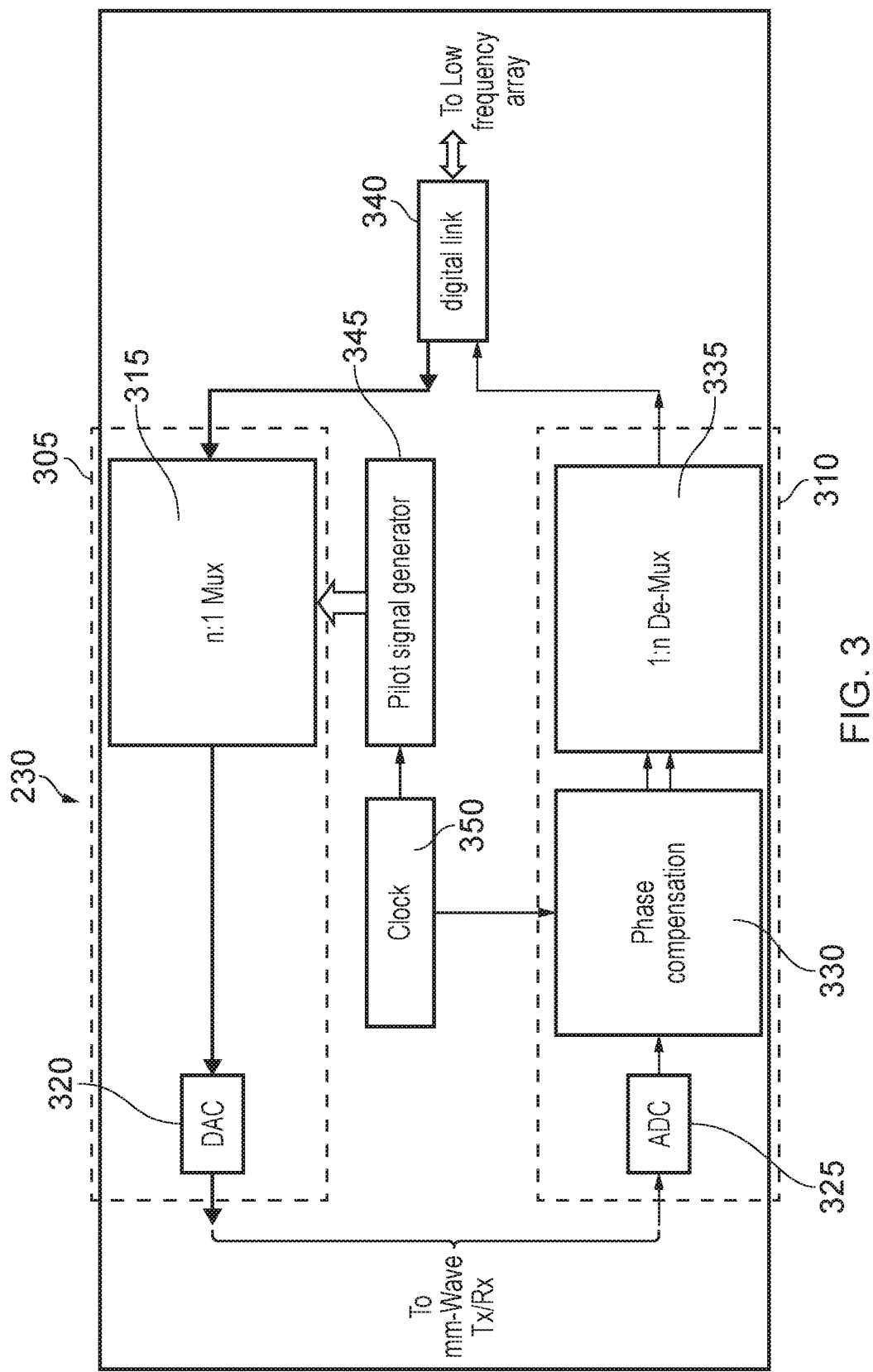
FIG. 3 illustrates an example configuration for a HAP-based multiplexing and phase compensation (MPC) unit.

An example embodiment of a HAP based multiplexing and phase correcting unit (MPC-H) 230 is illustrated in more detail in FIG. 3. The example MPC-H unit 230 comprises transmit and receiving paths 305, 310 respectively. A transmit path 305 comprises a multiplexing unit 315 and optionally a digital to analogue converter (DAC) 320. A receiving path 310 of the example MPC-H comprises an optional analogue to digital converter (ADC) 325; a phase compensation unit 330 and demultiplexing unit 335. Optionally, at least one bypass of the multiplexing element and the demultiplexing element may be provided on the transmit path and/or the receive path of the MPC-H respectively.

Multiplexing and Demultiplexing units, 315, 335 respectively, are required to manage communication channels between eNodeB and UE. Along the transmit path 305, the multiplexing unit 315 receives signals from a low frequency array via a digital link 340. A digital link is optionally used to allow multiplexing and phase compensation in the digital domain. The multiplexing unit 315 also receives pilot signals generated in a pilot signal generator 345. Pilot signals generated may optionally include information such as time, provided by a clock 350.

The multiplexing unit 315 may multiplex signals from n FH communication channels into a single signal to be transmitted by a mm-Wave transceiver 232. Conversion of low frequency signals to high frequency signals may be implemented by a mixer. The transceiver 232 may optionally be separate to or integrated with the MPC-H 230. Optionally, pilot signals generated by the pilot signal generator 345 may be distributed between frequency bands, on a wide bandwidth communication link by the multiplexer 315. Optionally, only one pilot signal may be required for the high frequency band. Digital to analogue conversion may be implemented on signals formed by the multiplexer 315, by the DAC 320 prior to transmission.

The pilot signal generator 345 may generate pilot signals comprising one or a combination of pilot tones and pilot symbols. A pilot tone comprises a signal with a characteristic comprising one or a combination of known frequency and/or known phase. A pilot symbol comprises a signal with a characteristic comprising one or a combination of a known symbol, known waveform, known time and/or known modulation. Pilot signals may be generated throughout the frequency range utilised on the BH communication link in order to correct for frequency dependent distortions. Optionally only one pilot signal may be required within the higher frequency bandwidth. The pilot signal generator is an example of a reference transmission generator that generates reference transmissions. Such reference transmissions can be pilot tones or pilot symbols or pilot waveforms having at least one predetermined characteristic.

Along the receiving path 310, a phase compensation unit 330 receives signals from a mm-Wave transceiver 232. Optionally an ADC 325 may be utilised prior to phase compensation. In the example embodiment, phase compensation may be corrected for using frequency. A clock 350 of the MPC-H 230 may provide phase and frequency information to the phase compensation unit 330. Phase correction may be performed by comparing at least one identified characteristic of a pilot signal, such as phase and/or frequency information received from the transceiver 232 with at least one expected characteristic for a pilot signal, such as phase and/or frequency information received from the clock 350. Knowing the frequency and phase with which a pilot signal was transmitted allows the phase compensation unit 330 to correct the phase of the pilot signal received.

Correction of high frequency signals received at the MPC-H 230 ensures that demultiplexed signals are transmitted by the low frequency array with the same frequency and relative phase as signals transmitted by the eNodeB. Once received signals have been corrected by the phase compensation unit 330 those signals are demultiplexed by a demultiplexing unit 335, wherein one high frequency multiplexed signal is demultiplexed into n low frequency baseband signals to be transmitted by the low frequency array.

Figure 4:
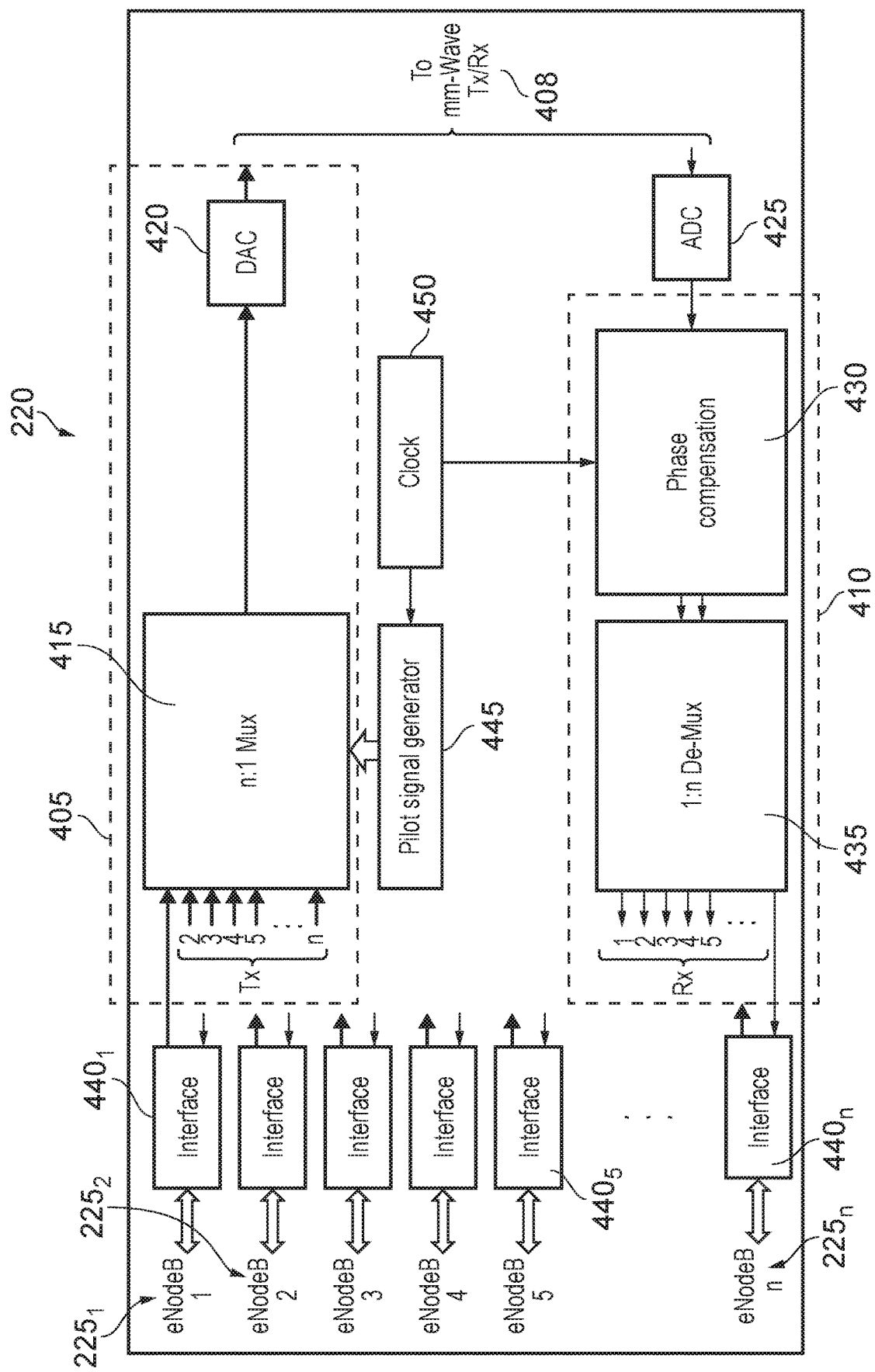
FIG. 4 illustrates an example configuration for a ground-based multiplexing and phase compensation (MPC) unit.

An example embodiment of a ground-based multiplexing and phase correcting unit (MPC-G) 220 is illustrated in FIG. 4. The example MPC-G unit 220 comprises transmit and receiving paths 405, 410 respectively. A transmit path 405 comprises a multiplexing unit 415 and optionally a digital to analogue converter (DAC) 420. A receiving path 410 of the example MPC-H 220 comprises an optional analogue to digital converter (ADC) 425; a phase compensation unit 430 and a demultiplexing unit 435.

Base-band signals generated by one or more eNodeB 225 are received at the multiplexing unit 415 via one or more eNodeB interface $440_{1-n}$. Base-band frequency signals are multiplexed into high frequency signals by the multiplexing unit 415. Optionally, conversion of low frequency signals into high frequency signals may be implemented by a mixer (not shown) that may be separate to or integrated with the multiplexing unit 415. The multiplexing unit 415 may also receive pilot signals from a pilot signal generator 445. Those pilot signals may comprise one or a combination of pilot tones and/or pilot symbols. Pilot signals generated may optionally include information such as time, provided by a clock 450. Pilot signals may be generated throughout the frequency range utilised on the BH communication link in order to correct for frequency dependent distortions. Optionally only one pilot signal may be required within the high frequency bandwidth. Multiplexed signals may then be transmitted by the mm-wave transceiver 227. The transceiver 227 may optionally be separate to or integrated with the MPC-G 220. The transceiver 227 may optionally be at least one or a combination of transmitter, receiver and/or transceiver. Optionally, at least one DAC 420 may be implemented in order to convert between digital and analogue domains, any benefits of which are clear to those skilled in the art.

Along the receiving path 410, a phase compensation unit 430 receives signals from the mm-Wave transceiver 227. Optionally an ADC 425 may be utilised prior to phase compensation.

In the example embodiment, A clock 450 of the MPC-G 220 may provide phase and frequency information to the phase compensation unit 430. Phase correction may be performed by comparing at least one identified characteristic of a pilot signal, such as phase and/or frequency information received from the transceiver 227 with at least one expected characteristic for a pilot signal, such as phase and/or frequency information received from the clock 450. Knowing the frequency and phase with which a pilot signal was transmitted allows the compensation unit 430 to correct the phase of the pilot signal received.

Correction of high frequency signals received at the MPC-G 220 ensures that demultiplexed signals are received by eNodeB with the same frequency and relative phase as signals transmitted by UE. Once received signals have been corrected by the phase compensation unit 430 those signals are demultiplexed by the demultiplexing unit 435, wherein one high frequency multiplexed signal is demultiplexed into n low frequency base-band signals to be received by n eNodeB 225.

Optionally, MPC units 220, 230 may not include multiplexing and/or demultiplexing capabilities. For example, in the case wherein there is one channel to process in the MPC, the signal may not require multiplexing. Alternatively, in an example wherein there is one channel to process in the MPC, the signal may optionally bypass a multiplexing and/or demultiplexing unit of the MPC unit 220, 230.

Figure 5:
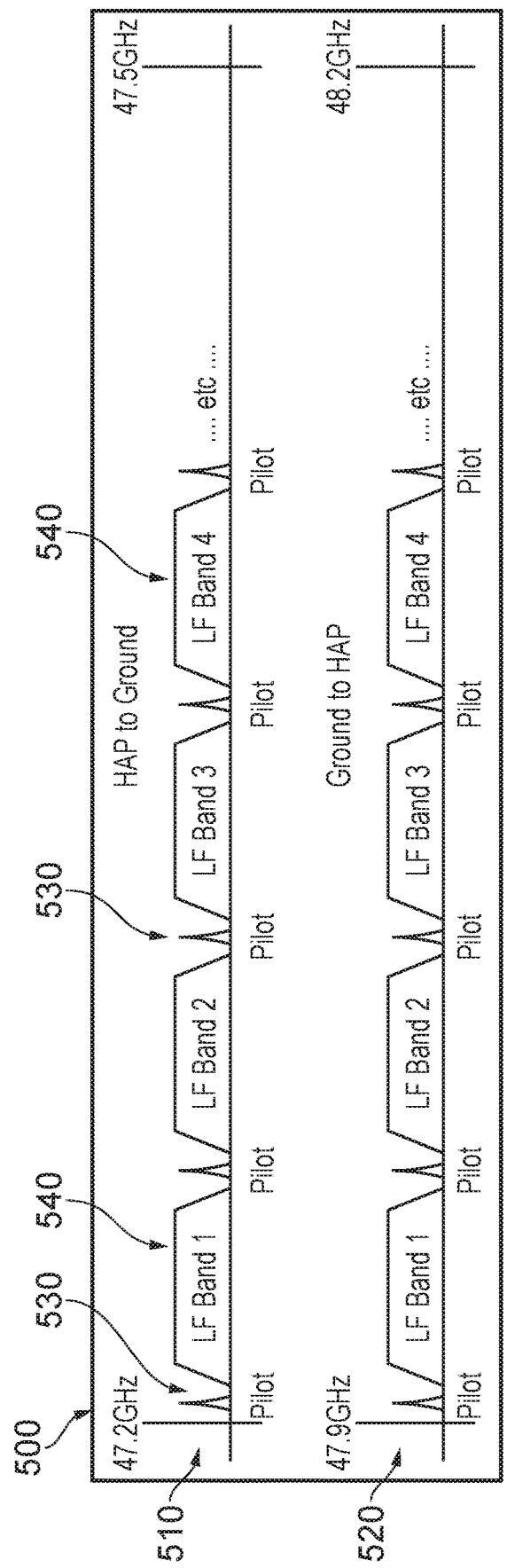
FIG. 5 illustrates examples of anticipated signals on a high frequency link, shown using a 48 GHz band.

Certain examples of high frequency beams utilised on BH communication links are described in FIG. 5. Division of bands within an example bandwidth are illustrated in spectra 500. High frequency may provide wider bandwidth. Optionally, high frequency may be a frequency in a range between 2 GHz to 80 GHz. A first spectrum 510 shown at the top of FIG. 5 illustrates frequency band allocations of low frequency bands and pilot signals within the high frequency band width for HAP to ground beams. A further spectrum 520 describes frequency allocations of low frequency bands and pilot signals within the high frequency band width for ground to HAP beams. The spectra 500 illustrate disposing pilot signals 530 between low frequency bands 540. Only one pilot signal frequency may be required for each high frequency band width. A benefit of disposing pilot signals throughout a frequency bandwidth is that signals may be corrected without decoding the signals, resulting in minimal processing on each HAP, thus reducing the payload for each HAP. Another benefit of disposing pilot signals throughout a frequency bandwidth is that the signal to noise ration of the pilot signals may be increased and hence the precision with which the phase may be corrected. Multiple pilot signals for each band width could of course be utilised.

Certain embodiments of the present invention thus make use of a large phased array antenna made up of many "tiles" of antenna elements and their associated signal processing. The low frequency array operates at low frequencies of around 2 GHz with up to around 100 MHz of bandwidth. This provides a communication link directly with users of user equipment. Certain embodiments of the present invention transfer signals from a backhaul to the low frequency array. This operates by transferring the RF wave form on an incoming band onto the outgoing band. This provides an effective RF mirror with frequency translation. As a consequence, aggregate band width used on the low frequency array is available on the high frequency array. An advantage of using very high frequencies (for example 48 GHz bands assigned to HAPs) is that there is much wider band width available per Backhaul beam. This helps reduce a number of beams required to provide sufficient integrated band width for the low frequency array to operate.

Certain embodiments of the present invention make use of in-band pilot signals for forward error correction to the phase of high frequency RF links. Aptly the in-band pilot signals are for use in correcting high frequency links linking aerial vehicles to the ground.

MPC units can be utilised to multiplex many signals from eNodeB's onto backhaul mm-Wave links to an aerial vehicle. Optimally or alternatively the MPC units can be utilised to de-multiplex the channels at an aerial vehicle (such as a HAP) to pass the low frequency array for transmission as cells on the ground. Optionally or alternatively the MPC units can be utilised to correct for phase errors on the mm-Wave channel caused by aircraft motion.

Aptly two MPCs can be utilised. One is based at the ground-based station to RF link and the other on the aerial vehicle to interface the mm-Wave link to the low frequency array.

Aptly the present invention provides a computer program product stored on a non-transitory computer readable storage medium comprising computer instructions that, when executed on at least one processor-based device, cause the at least one processor-based device to correct phase in communication signals. The processor-based device receives at least one pilot signal, identifies at least one characteristic of the pilot signal, compares the characteristic with at least one predetermined or expected characteristic and causes a correction in phase thus correcting a shift in frequency and phase based upon a difference between the identified characteristic and the predetermined/expected characteristic.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for correcting frequency and/or phase in a communication link, comprising:
   receiving, at an aerial vehicle, at least one reference transmission, generated by a reference transmission generator of a ground-based station and communicated from the ground-based station to the aerial vehicle via a wide bandwidth wireless communication link, the at least one reference transmission communicated as pilot signals distributed between frequency bands on the communication link;
   providing, by the aerial vehicle, at least one identified characteristic by identifying at least one characteristic of the reference transmission;
   comparing, by the aerial vehicle, said identified characteristic with at least one expected characteristic; and
   correcting, by the aerial vehicle, a shift in frequency and/or phase of at least one communication signal communicated via the communication link based on a difference between the identified characteristic and the expected characteristic.

2. The method as claimed in claim 1, wherein the reference transmission has a frequency range within a high frequency bandwidth up to 10 MHz.

3. The method as claimed in claim 1, wherein the reference transmission comprises one or a combination of:
   at least one pilot symbol, at least one pilot tone and/or a pilot complex waveform.

4. The method as claimed in claim 1, wherein the at least one characteristic comprises one or a combination of:
   frequency, time, phase, symbol, waveform, and/or modulation.

5. The method as claimed in claim 1, wherein the at least one expected characteristic comprises one or a combination of:
   frequency, time, phase, symbol, waveform, and/or modulation.

6. The method as claimed in claim 1, wherein the communication signal is of mm-Wave frequency.

7. A method for correcting frequency and/or phase in a communication link, comprising:
   receiving, at a ground-based station, at least one reference transmission, generated by a reference transmission generator of an aerial vehicle and communicated from the aerial vehicle to the ground-based station via a wide bandwidth wireless communication link, the at least one reference transmission communicated as pilot signals distributed between frequency bands on the communication link;
   providing, by the ground-based station, at least one identified characteristic by identifying at least one characteristic of the reference transmission;
   comparing, by the ground-based station, said identified characteristic with at least one expected characteristic; and
   correcting, by the ground-based station, a shift in frequency and/or phase of at least one communication signal communicated via the communication link based on a difference between the identified characteristic and the expected characteristic.

* * * * *